Nov. 10, 1959    J. Z. DE LOREAN    2,912,085
BRAKE MECHANISM
Filed April 4, 1958    2 Sheets-Sheet 1

INVENTOR.
John Z. DeLorean
BY
W. C. Middleton
ATTORNEY

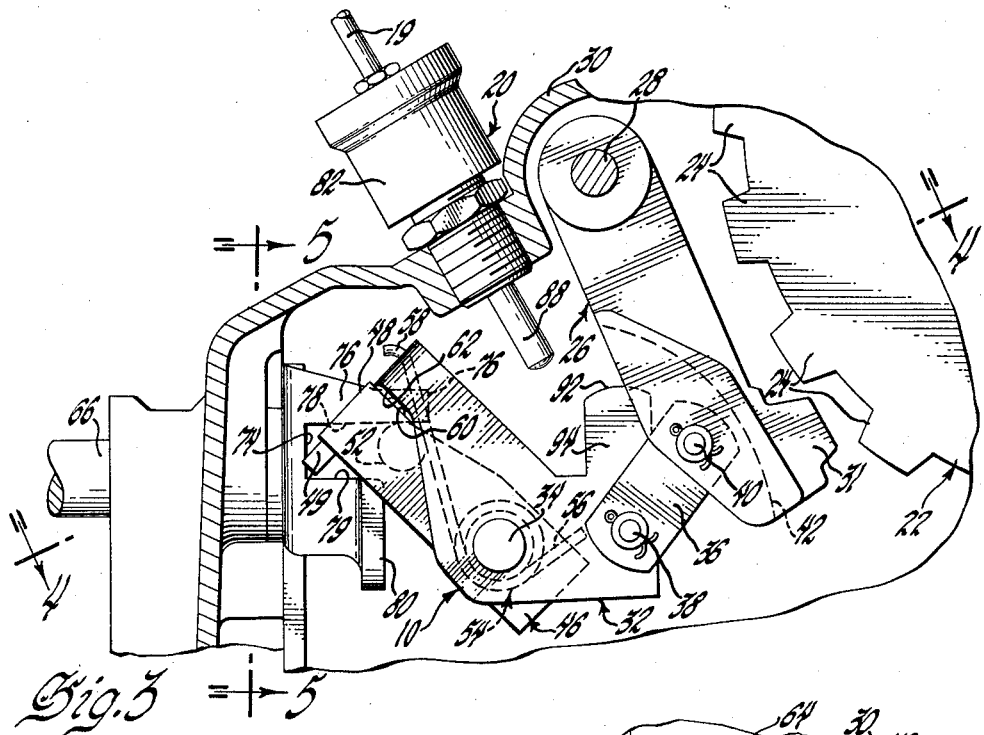
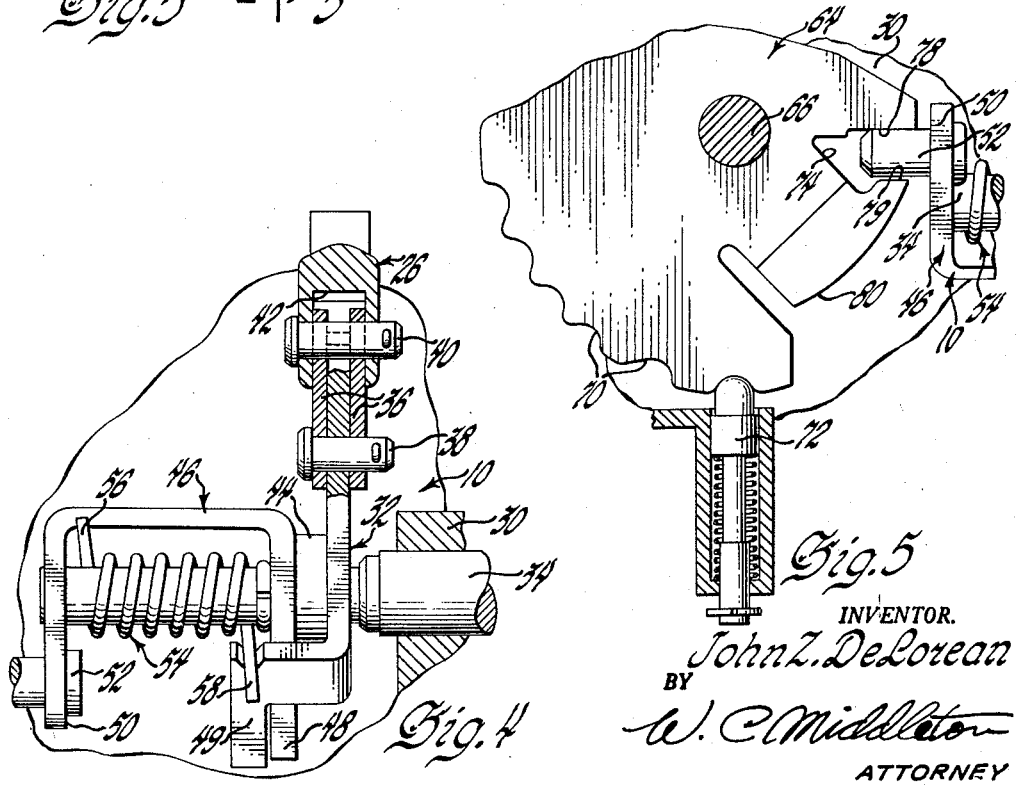

United States Patent Office 2,912,085
Patented Nov. 10, 1959

2,912,085

BRAKE MECHANISM

John Z. De Lorean, Birmingham, Mich., assignor to General Motors Corporation, Detroit, Mich., a corporation of Delaware Application April 4, 1958, Serial No. 726,428

8 Claims. (Cl. 192—4)

This invention relates generally to brake mechanisms and particularly to improvements in parking brake mechanisms for motor vehicles.

In brake mechanisms of the positive type wherein teeth interengage to resist movement of a rotatable member, disengagement under load presents a serious problem. To explain, assume that a vehicle is provided with a parking brake mechanism and that the vehicle is parked on a relatively steep incline with the parking brake mechanism engaged. Due to the inherent nature of a toothed positive brake, the engaging surfaces thereof have force components acting thereon that, in preventing movement of the vehicle, also resist disengagement of the teeth. As a result, leverages afforded by multiple links and levers, allowing the operator to manually disengage the brakes, must be increased with resultant increased strains on the links and levers. Moreover, manufacturing tolerances vary altering the geometry of different brakes so that one brake may be disengaged easily while another disengages with difficulty. Consequently, dimensional tolerances must be held close and the parts made larger to withstand the added strains, both of which increase the overall cost of each brake.

With these problems in mind, the invention contemplates the provision of a brake mechanism with an auxiliary means for assisting in the disengagement thereof.

More particularly, the invention affords a parking brake mechanism for a motor vehicle, the manual disengagement of which is assisted by the actuation of the vehicle brakes.

Specifically, the invention provides an auxiliary servo motor in communication with the hydraulic wheel brake system of a motor vehicle so that upon engagement of the wheel brakes the servo motor is operated and assists in the manual disengagement of a parking brake mechanism.

According to one form of the invention, the parking brake mechanism is of the character that, by a manually operated selector and through linkage or other suitable agency, is moved to and from an engaged position with a locking gear on the transmission output shaft. To assist the manual disengagement of the brake, an auxiliary servo motor is installed in fluid communication with a master cylinder for the hydraulic system that operates the vehicle wheel brakes. When a brake pedal is depressed to operate the master cylinder and engage the wheel brakes, fluid pressure for engaging the wheel brakes is simultaneously supplied to the auxiliary servo motor whereupon the parking brake is urged towards the disengaged position. This permits a complete disengagement to be effected by the manual selector with only a minimum effort required on the part of the operator.

The foregoing and other objects and advantages of the invention will be apparent from the following description and the accompanying drawings, in which:

Figure 3 is a view of the brake mechanism, similar to Figure 2, illustrating the mechanism in the disengaged position;

Figure 4 is a fragmentary view along line 4—4 of Figure 3; and

Figure 5 is a view of the sector plate for the mechanism along line 5—5 of Figure 3.

Figure 1:
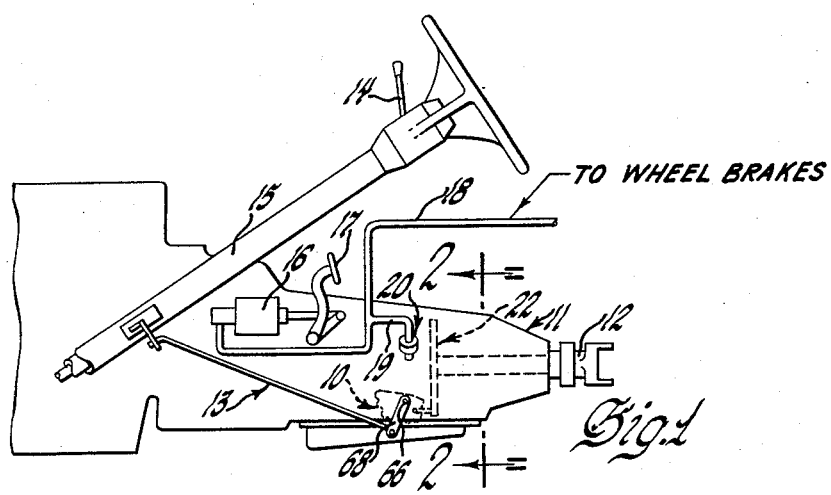
Figure 1 is a side view of a vehicle transmission embodying a parking brake mechanism constructed according to the invention and illustrating schematically the brake system for the vehicle.

In a preferred embodiment shown by Figure 1, a parking brake mechanism, indicated generally at 10, is combined with a transmission 11 to prevent rotation of a transmission output shaft 12 in either direction and, accordingly, the associated vehicle wheel (not shown). The parking brake mechanism 10 is operated through a suitable agency, as linkage 13, by a conventional transmission selector lever 14 of a character that revolvably mounts on a steering column 15. The vehicle wheel brakes (not shown) are hydraulically operated in a known manner by a conventional brake master cylinder 16. Briefly, when a brake pedal 17 is depressed, brake apply fluid pressure is transferred by the master cylinder 16 through a main brake pressure supply conduit 18 to the vehicle brakes. A branch 19 of the conduit 18 is in communication with an auxiliary device, such as servo motor 20, which assists in disengaging the parking brake mechanism 10 as will be explained.

Figure 2:
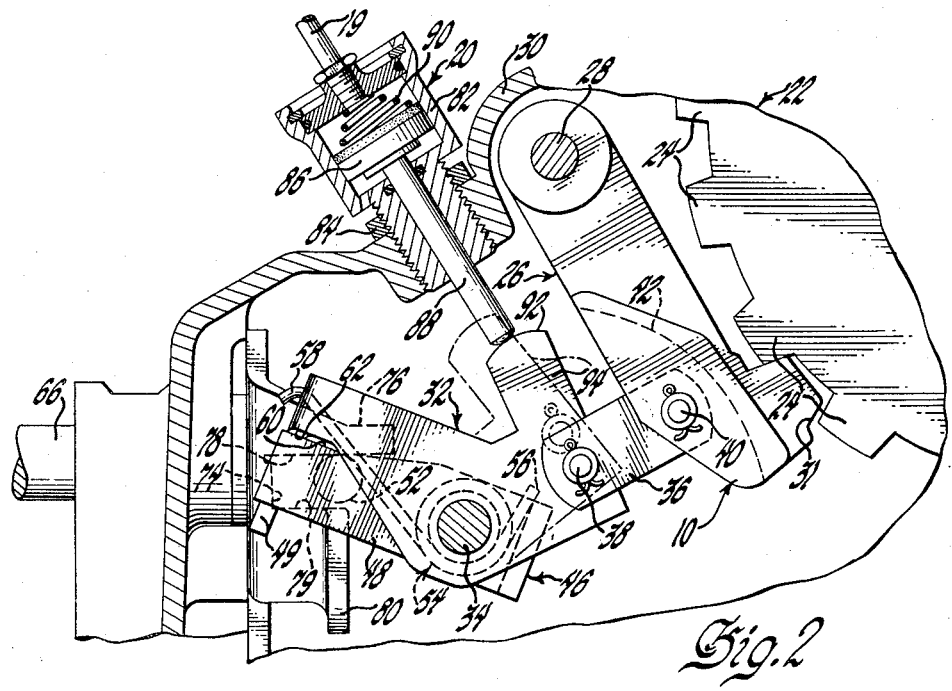
Figure 2 is a view of the brake mechanism along line 2—2 of Figure 1 depicting the mechanism in the engaged position.

With reference to Figures 2 and 3, in particular, a locking member, such as toothed locking gear 22, is drive connected to the transmission output shaft 12 and comprises a series of peripherally spaced teeth 24. Opposite the locking gear 22, a locking element, e.g., toothed pawl element 26, is rotatably mounted on a stub shaft 28 supported by the transmission casing 30. A tooth 31 on a pawl element 26 is arranged to interengage with the teeth 24 on the locking gear 22 when aligned therewith.

The extent of movement of the pawl element 26 is determined by a control lever 32 rotatably mounted on a cross shaft 34 installed in the transmission casing 30. A pair of links 36 are positioned on opposite sides of the control lever 32 and by clevis pins 38 and 40, respectively, join the control lever 32 and the pawl element 26. The links 36 are located on the exterior sides of the lever 32 but are disposed within an arcuate recess 42 along the back side of the pawl element, as illustrated in Figure 4.

Also, rotatably mounted on the cross shaft 34 and separated from the lever 32 by a spacer 44 is a U-shaped transfer lever 46 comprising an arm 48 partially enveloped by a lateral extension 49 on the control lever 32 (see Figure 4) and an opposite arm 50 to which a drive pin 52 is attached. A torsion spring 54 is positioned on the shaft 34 between the arms 48 and 50 of the transfer lever 46 and includes a leg 56 in engagement with the transfer lever 46 and an opposite leg 58 in engagement with the lateral extension 49 on the control lever 32. The effect of the spring 54 is to constantly exert a bias which engages drive surfaces 60 and 62 on the lateral extension 49 of the control lever 32 and the arm 48 of the transfer lever 46, respectively. When the pawl element 26 is engaged, a slight gap depicted in Figure 2 occurs between the drive surfaces 60 and 62 creating a load on the spring 54 sufficient to insure a full engagement of the coacting teeth 31 and 24. In other words, a slight preload is produced which, when the pawl element is in the engaged position, urges the teeth 31 and 24 into tighter engagement.

As viewed in Figure 5 a sector plate, shown generally at 64, is secured to one end of a shaft 66 while the opposite end of the shaft extends to the exterior of the transmission casing 30 and is attached to an external shift lever 68 (see Figure 1). The lever 68 is then, as mentioned before, connected to the transmission selector lever 14 by an appropriate linkage 13. Along one edge of the sector plate 64, a series of notches 70 are furnished which correspond to the various transmission settings of the selector lever 14, e.g., Neutral, Park, Reverse and Forward Drive. In Figure 5 the sector plate 64 is shown releasably maintained in the Park or Brake position by the engagement of a spring biased detent plunger 72 with one of the notches 70 representing the Park position. The force exerted by the detent plunger 72 is intended to be only sufficient to maintain the transmission selector lever 14 in the chosen setting so that the operator senses each position as the lever 14 is rotated. This force is easily overcome when the selector lever 14 is repositioned.

On the opposite side of the sector plate 64 from the notches 70, a drive slot 74 is provided for accommodating the drive pin 52 when the sector plate 64 is in the Park position. As shown by Figures 2 and 3, the drive slot 74 is defined by a rearwardly extending projection 76, the under surface 78 of which engages the drive pin 52 when the sector plate 64 is rotated clockwise, as viewed in Figure 5. When the sector plate 64 is rotated counterclockwise from the Park position, an upwardly facing surface 79 at the bottom of the drive slot 74 will engage the drive pin 52 and rotate it and the transfer lever 46 clockwise, as illustrated in Figure 3, until the pin 52 is removed from the slot 74 whereupon the pin will engage the surface afforded along a flange 80 on the sector plate 64. The flange 80 prevents (see Figure 3) counterclockwise rotation of the drive pin 52 and the transfer lever 46 which motion corresponds to the engaging movement of the pawl element 26.

The servo motor 20, which as mentioned, functions to assist in moving the pawl element 26 to the Figure 3 disengaged position, includes a cylinder 82 threadedly attached to the transmission casing in the vicinity of the parking brake 10 and is maintained in position by a lock nut 84. A piston 86 is slidable in the cylinder 82 and has a piston rod 88 formed either integral therewith or separately attached thereto. The piston rod 88 is biased downwardly by a light spring 90 and with the pawl element 26 in the Figure 2 position engages an arcuate control surface 92 on an extension 94 of the control lever 32. The weight of the spring 90 is not sufficient to interfere with the function of the parking brake 10 and prevents rattles as well as free movement of the piston 86 when relieved of pressure. The position of the servo motor cylinder 82 is somewhat important in the determination of the distance to be traveled by the piston rod 88 and hence the lock nut 84 permits an adjustment to be made and maintained. The lock nut 84 may be replaced by shims which may be selected of different widths to accurately position the cylinder 82 for the desired travel of the piston rod 88.

Since it is considered normal for the vehicle driver to depress the brake pedal so as to apply the vehicle brakes whenever the selector lever 14 is removed from the Park position, this driver action is utilized in operating the servo motor 20. Therefore, whenever the brakes are applied, pressure fluid in branch 19 of the main brake pressure supply conduit is simultaneously transferred to the servo motor 20. The piston rod 88 is forced downwardly thereby against the arcuate control surface 92 and urges the pawl element 26 towards the Figure 3 disengaged position. This assistance from servo motor 20 lessens the manual effort required by the driver in removing the selector lever 14 from the Park position.

To summarize the operation, assume first that the transmission selector lever 14 is moved to the Park position. As a result, the sector plate 64 through the linkage 13, external shift lever 68 and shaft 66 will be rotated to the Figure 5 position. This rotation effects a pickup of the drive pin 52 by the under surface 78 of the projection 76 and moves the pin into the drive slot 74 on the plate 64. Hence, the U-shaped transfer lever 46 will be rotated therewith and through the torsion spring 54 revolve the control lever 32 and the pawl element 26 through links 36 to the Figure 2 position. If the pawl element tooth 31 and the teeth 24 on the locking gear 22 are not properly aligned, e.g., the tooth 31 engages the top of one of the teeth 24, then the resilient connection afforded by the spring 54 will allow the transmission selector lever 14 as well as the sector plate 64 and transfer lever 46 to be rotated to the pawl element engaged position. However, since the pawl element 26 is held out of engagement, the drive surfaces 60 and 62 on the arm 48 of the transfer lever 46 and the extension 50 on the control lever 32 will be separated a predetermined distance until the locking gear 22 is rotated slightly to permit engagement of the tooth 31 with the locking gear teeth 24, whereupon the spring bias built up will quickly effect the engagement. With an optimum condition, the centers of the shaft 34 and the pins 36 and 40 will be along a straight line providing strut action which resists disengagement of the pawl element 26. Due to manufacturing tolerances, the center of the pin 38 may be overcenter, i.e., slightly above this straight line as represented by the dotted lines in Figure 2.

Next, when the transmission selector lever 14 is moved to a setting other than the Park position, the surface 79 along the bottom edge of drive slot 74 of the sector plate 64 will rotate the drive pin 52 and accordingly, the transfer lever 46 clockwise, as seen in Figure 3, whereupon the drive surface 60 along the transfer lever arm 48 will engage the drive surface 62 on the control lever extension 50. A positive pull out then is provided, in addition to the assist from servo motor 20, if the brakes are engaged, so that further rotation of the transfer lever 46 will rotate the control lever 32 and through links 46 pull the pawl element 26 out of engagement with the locking gear 22 (Figure 3).

The tooth side angles of the pawl element tooth 31 and of the locking gear teeth 24 may be selected so as to minimize the pull out effort. Consequently, under some conditions the operator may be able to disengage the parking brake 10 without excessive effort and without applying the brakes. However, if any resistance is encountered, then the brake pedal 17 may be depressed and the servo motor 20 will move the control lever 32 sufficiently to interrupt the strut relationship and disengage the pawl element 26. Further movement of the selector lever 14 from the Park position is therefore unimpeded. Because manufacturing tolerances accummulate, especially when multiple links and levers are employed, the aforementioned straight line formed by the centers of the shaft 34 and the pins 38 and 40 is not always possible. As a result, these tolerances are selected to insure that the brake in the engaged position is always fully engaged, which means that the center of the pin 38 can vary from the straight line position in Figure 2 to some point above center such as that shown somewhat exaggerated by the dotted lines in Figure 2. When the pin 38 is overcenter, the effort required to disengage the parking brake 10 is considerably increased since the center 38 must be moved first to the straight line position. With the servo motor 20, the fact that the center 38 is above the desired straight line is not a serious problem, for by simply applying the wheel brakes the motor 20 is actuated and will move the control lever 32 downwardly sufficiently to be easily disengaged. Therefore, critical dimensions are not a factor and production costs can be reduced.

With the foregoing arrangement the condition occurring when a vehicle is parked on a steep hill, with the parking brake engaged, presents no vehicle rolling or difficult parking brake disengagement problems, since the act of depressing the brake pedal desirably holds the vehicle stationary and also assists in disengaging the parking brake. Moreover, it should be noted that the addition of the servo motor 20 does not impose any burden of the hydraulic wheel brake system since, normally, there is no increase in the fluid displacement requirements.

The invention is to be limited only by the following claims.

I claim:

1. In a parking brake mechanism for a vehicle having wheel brakes and means for engaging the wheel brakes, the combination of a rotatable member drive connected to the vehicle wheels, a locking member connected to the rotatable member, a locking element movable to and from an engaged position relative to the locking member so as to prevent rotation of the rotatable member, manually controlled means for moving the locking element to and from the engaged position, and auxiliary means rendered operative by the means for engaging the wheel brakes so as to move the locking element from the engaged position.

2. In a parking brake mechanism for a vehicle having wheel brakes and wheel brake controlling mechanism the combination of a rotatable member drive connected to the vehicle wheels, a locking member connected to the rotatable member, a locking element movable to and from an engaged position relative to the locking member so as to prevent rotation of the rotatable member, manually controlled means for moving the locking element to and from the engaged position, and auxiliary means rendered operative by the wheel brake controlling mechanism so as to remove the locking element from the engaged position.

3. In a parking brake mechanism for a vehicle having wheel brakes and wheel brake controlling mechanism, the combination of a rotatable member drive connected to the vehicle wheels, a locking member connected to the rotatable member, a locking element movable to and from an engaged position relative to the locking member so as to prevent rotation of the rotatable member, manually controlled means for moving the locking element to and from the engaged position, and auxiliary means rendered operative by the wheel brake controlling mechanism when the wheel brakes are engaged by wheel brake controlling mechanism so as to assist the manually controlled means in removing the locking element from the engaged position.

4. In a parking brake mechanism for a vehicle having wheel brakes and wheel brake controlling mechanism the combination of a rotatable member drive connected to the vehicle wheels, a toothed locking member connected to the rotatable member, a toothed locking element movable to and from an engaged position relative to the locking member so as to prevent rotation of the rotatable member, manually controlled means for moving the locking element to and from the engaged position, and auxiliary means operated by the wheel brake controlling mechanism, the auxiliary means being rendered operative when the wheel brakes are engaged by the wheel brake controlling mechanism to coact with the toothed locking element so as to assist the manually controlled means in the removal thereof from the engaged position.

5. In a parking brake mechanism for a vehicle having fluid pressure actuated wheel brakes, the combination of a rotatable member drive connected to the vehicle wheels, a toothed locking member connected to the rotatable member, a toothed locking element movable to and from an engaged position relative to the locking member so as to prevent rotation of the rotatable member, manually controlled means for moving the locking element to and from the engaged position, and a servo motor including a piston positioned adjacent the locking element, the piston being operated by the wheel brake fluid pressure when the wheel brakes are actuated so as to coact with the locking element and assist the manually controlled means and the removal thereof from the engaged position.

6. In a transmission parking brake mechanism for a vehicle having fluid pressure actuated wheel brakes, the combination comprising a transmission output shaft drive connected to the vehicle wheels, a locking gear connected to the output shaft, a toothed pawl having a control surface thereon, the pawl being movable to and from an engaged position relative to the locking gear so as to prevent rotation of the output shaft, a manually controlled transmission selector movable to and from a Park position, means interconnecting the transmission selector and the toothed pawl so that in the Park position of the transmission selector the toothed pawl is urged to the engaged position, the interconnecting means including a motion transmitting member with a control surface thereon, and a servo motor including a piston with a rod portion disposed adjacent the control surface on the motion transmitting member, the piston being hydraulically operated by the wheel brake fluid pressure when the wheel brakes are actuated so that the rod portion engages the control surface and urges the pawl from the engaged position thereby assisting the transmission selector.

7. In a transmission parking brake mechanism for a vehicle having fluid pressure actuated wheel brakes, the combination comprising a transmission output shaft drive connected to the vehicle wheels, a locking gear connected to the output shaft, a toothed pawl movable to and from an engaged position relative to the locking gear so as to prevent rotation of the output shaft, a manually controlled transmission selector movable to and from a Park position, means interconnecting the transmission selector and the toothed pawl so that in the Park position of the transmission selector the toothed pawl is urged to the engaged position, the interconnecting means including a motion transmitting member with a control surface thereon, a servo motor including a piston with a rod portion disposed adjacent the control surface on the motion transmitting member, the piston being hydraulically operated by the wheel brake fluid pressure when the wheel brakes are actuated so that the rod portion engages the control surface and urges the pawl from the engaged position thereby assisting the transmission selector, and biasing means continuously urging the piston rod portion towards the pawl control surface.

8. In a transmission parking brake mechanism for a vehicle having wheel brakes and a brake pedal operated hydraulic master cylinder for engaging the wheel brakes hydraulically when the pedal is actuated, the combination comprising a transmission output shaft drive connected to the vehicle wheels, a locking gear connected to the transmission output shaft, a toothed pawl movable to and from an engaged position relative to the locking gear so as to prevent rotation of the rotatable member, a manually controlled transmission selector movable to and from a Park position, linkage interconnecting the transmission selector and the toothed pawl so that in the Park position of the transmission selector the toothed pawl is urged to the engaged position, the linkage including a control lever with a control surface thereon, and a servo motor in fluid communication with the brake master cylinder and including a piston with a rod portion disposed adjacent the control surface on the control lever, the piston being hydraulically operated by fluid pressure from the master cylinder when the brake pedal is actuated to engage the wheel brakes so that the rod portion engages the control surface and urges the pawl from the engaged position thereby assisting the transmission selector in the removal thereof.

References Cited in the file of this patent

UNITED STATES PATENTS 2,821,275 Martin _____ Jan. 28, 1958